George Thomas Baker and Victor Edmund Mann
by George Steinberg attorney

Aug. 26, 1958 G. T. BAKER ET AL 2,849,535

MAGNETIC DRUM TYPE TELEPHONE METERING SYSTEM

Filed Feb. 14, 1955 5 Sheets-Sheet 2

George Thomas Baker and Victor Edmund Mann
by Dezsoe Steinberg attorney

Aug. 26, 1958 G. T. BAKER ET AL 2,849,535

MAGNETIC DRUM TYPE TELEPHONE METERING SYSTEM

Filed Feb. 14, 1955 5 Sheets-Sheet 3

George Thomas Baker and Victor Edmund Mann by [signature] Attorney

Aug. 26, 1958 G. T. BAKER ET AL 2,849,535

MAGNETIC DRUM TYPE TELEPHONE METERING SYSTEM

Filed Feb. 14, 1955 5 Sheets-Sheet 4

George Thomas Baker and Victor Edmund Mann by Dyson Steinberg attorney

Inventors
George Thomas Baker and
Victor Edmund Mauw
by Dessoe Steinberg attorney 2,849,535

MAGNETIC DRUM TYPE TELEPHONE METERING SYSTEM

George Thomas Baker and Victor Edmund Mann, Taplow, England, assignors to British Telecommunications Research Limited, Taplow, England, a British company Application February 14, 1955, Serial No. 487,948

Claims priority, application Great Britain February 15, 1954

13 Claims. (Cl. 179—7)

The present invention relates to telephone systems and is primarily concerned with systems in which a register device of the magnetic drum type is employed at some stage of a call to register some or all of the information supplied by a calling subscriber to indicate the destination of the call. Such magnetic drums are now well-known components in the communication and computing arts and they are capable of storing a large amount of information in a comparatively small space by the selective magnetisation of a thin layer of magnetic material in a plurality of circumferential tracks. For this reason it is economically feasible for a plurality of subscribers' lines or battery feeding bridges to remain associated with a drum on a time division basis throughout a connection so that the drum can exert continuous control.

Application Serial No. 300,432, filed July 23, 1952, of G. T. Baker, describes an arrangement in which a device of this type serves to effect translation of the exchange code dialled by a calling subscriber so as to provide the appropriate routing digits as required by the layout of the system in accordance with current practice for large networks. The present invention represents a further development in the use of magnetic drums and permits the control of metering to be effected by means of a magnetic drum which may also be employed for controlling other functions in the setting up of the connection.

According to the invention, in a telephone system employing a register device of the magnetic drum type for determining the appropriate operation of a calling party's meter, sufficient digits of a called party's number to determine the basis of charging are recorded on the magnetic drum and are then compared with permanent recordings representing possible numbers corresponding to the different charging bases until identity is found whereupon a further permanent recording associated with that corresponding to the selected charging basis is transferred to the storage space associated with the calling party and serves to control the operation of the calling party's meter.

Figure 1:
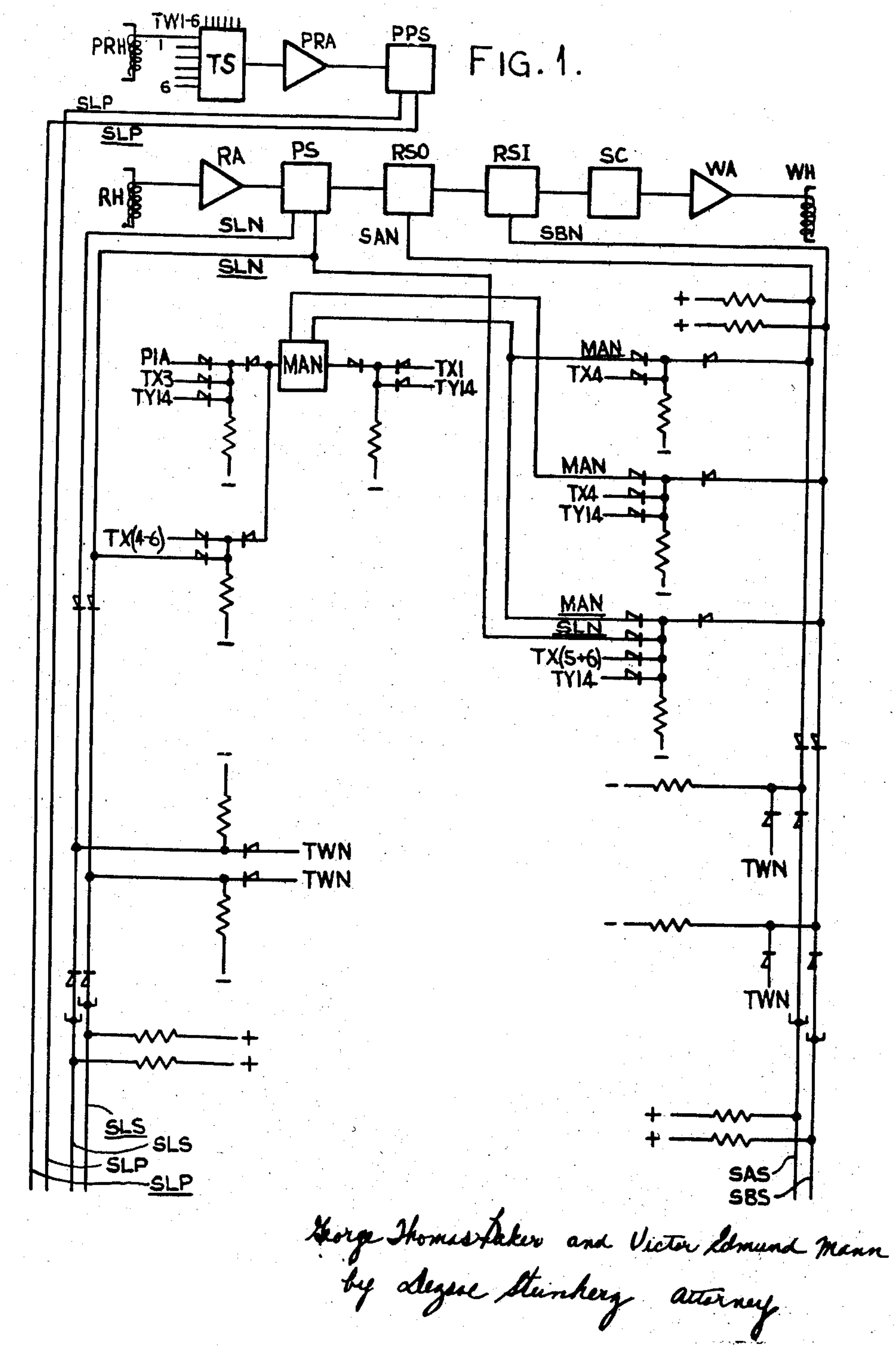
Figure 2:
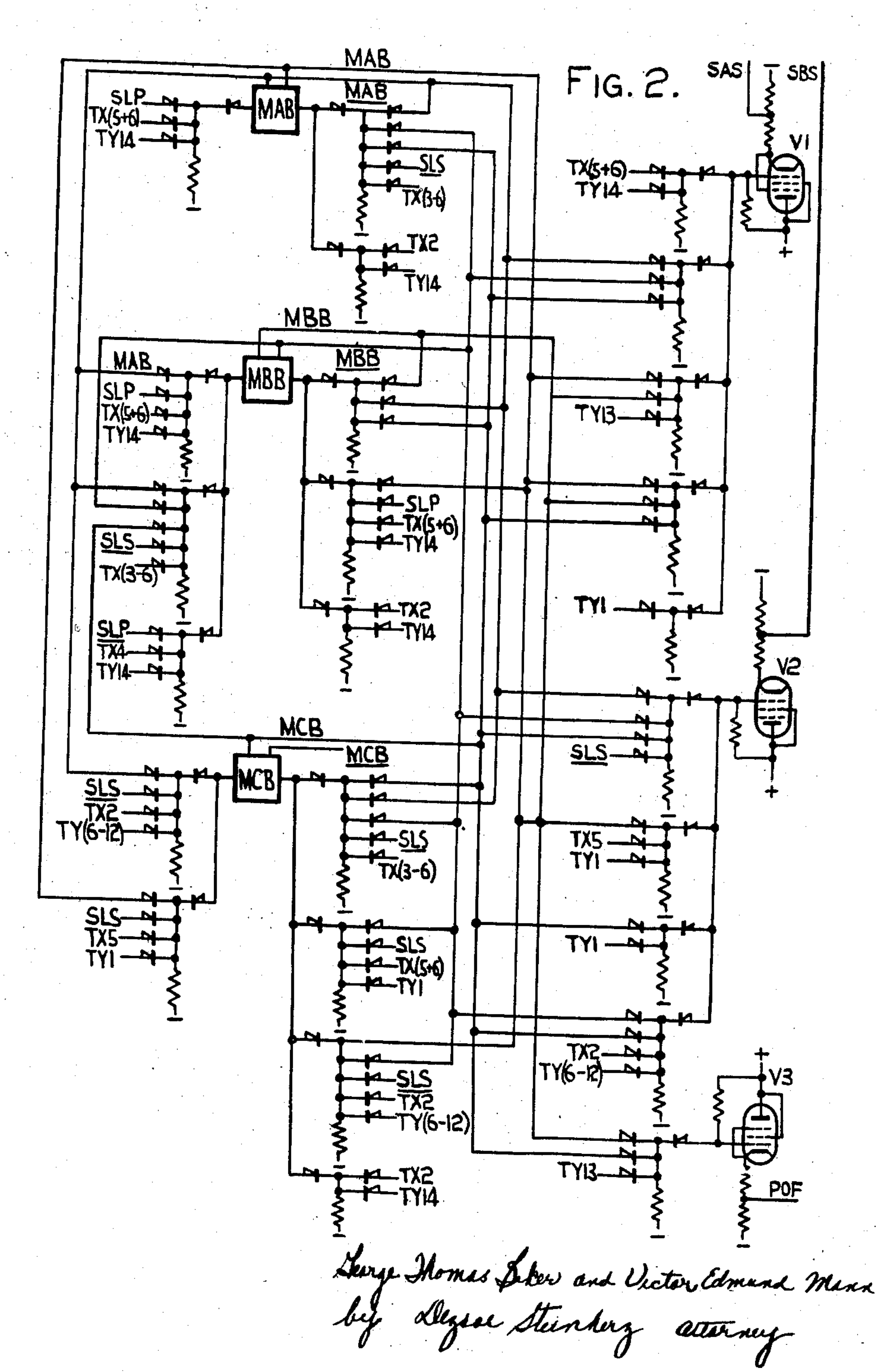
Figure 3:
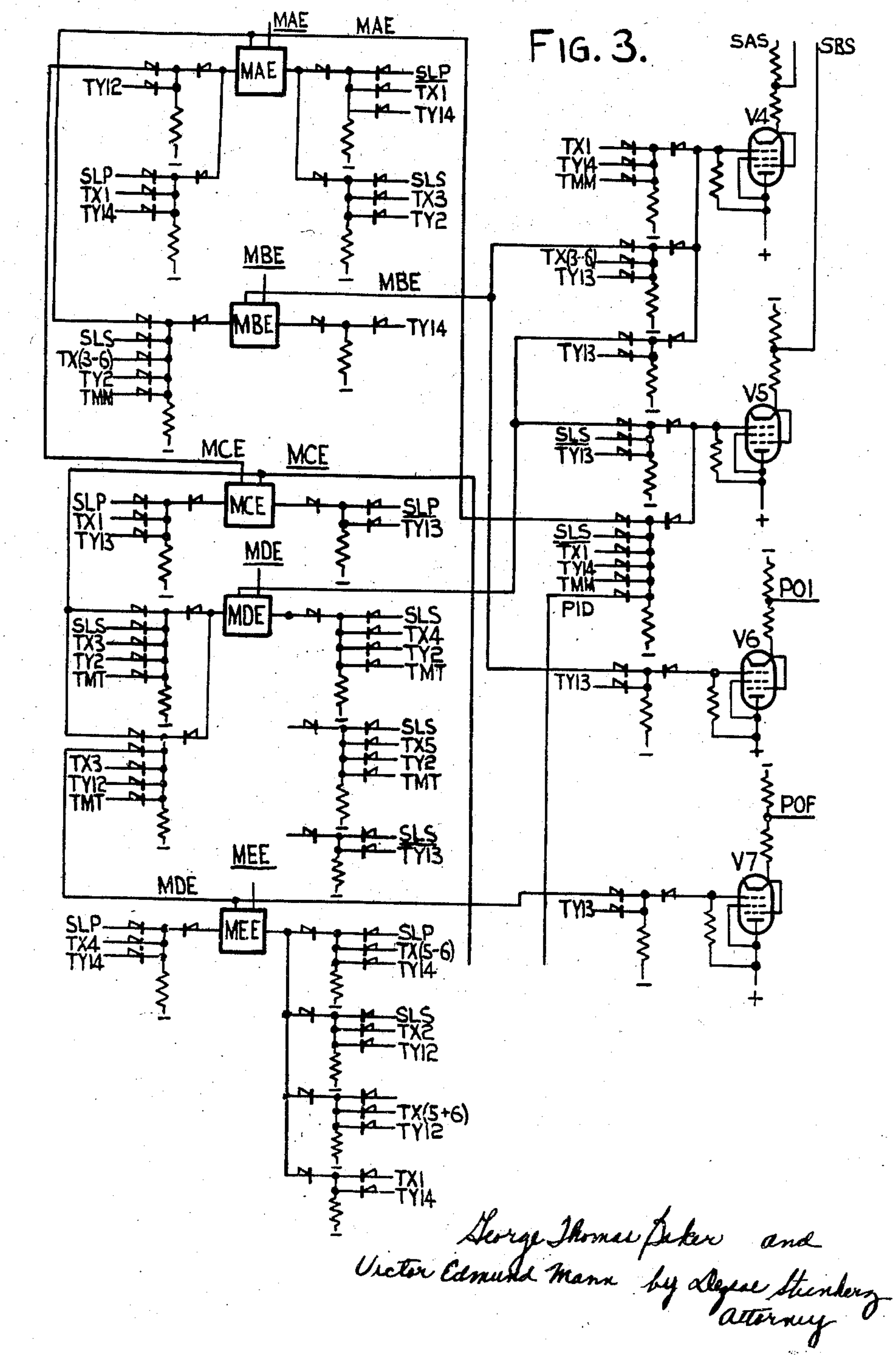
Figure 4:
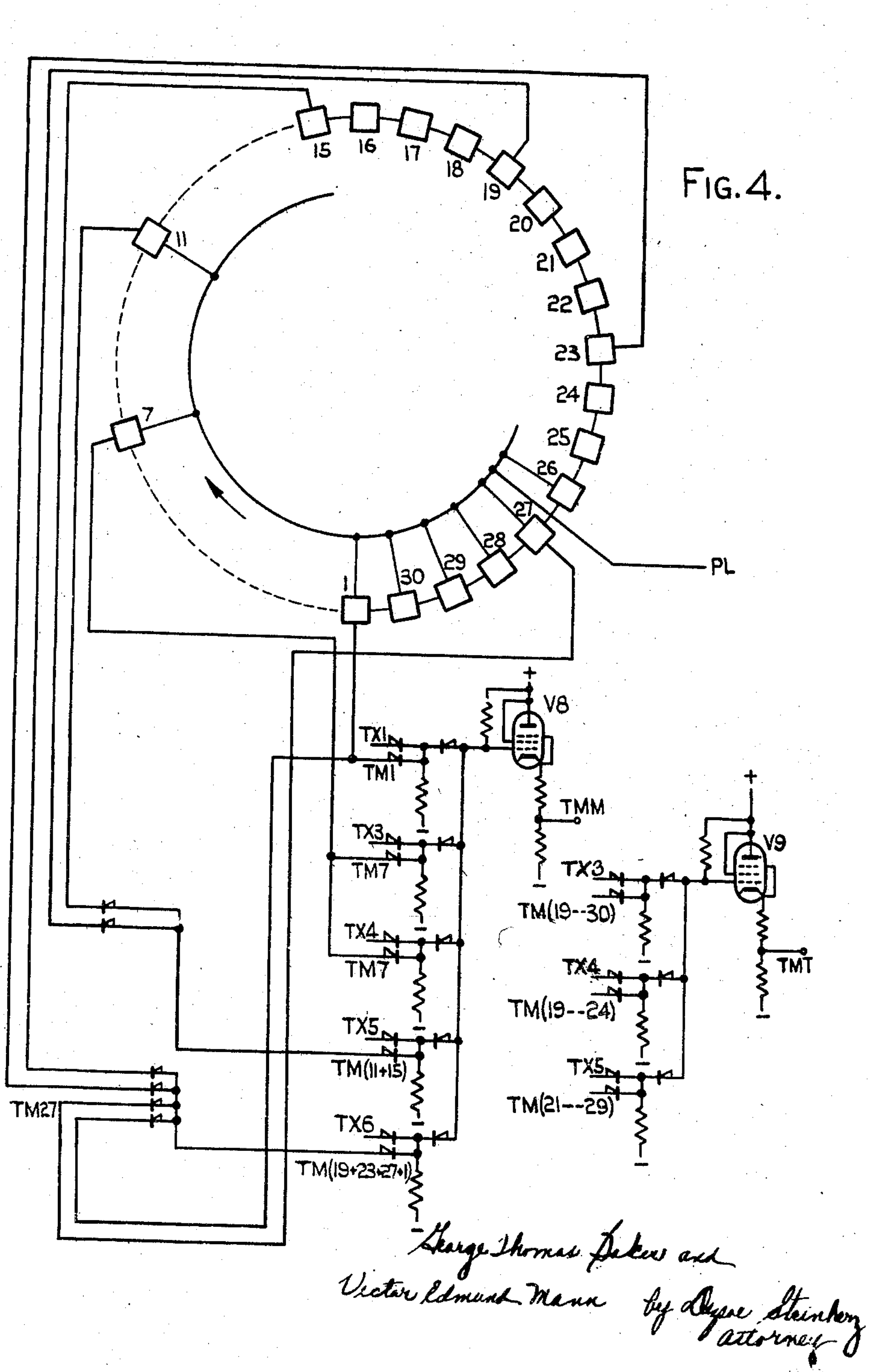
Figure 5:
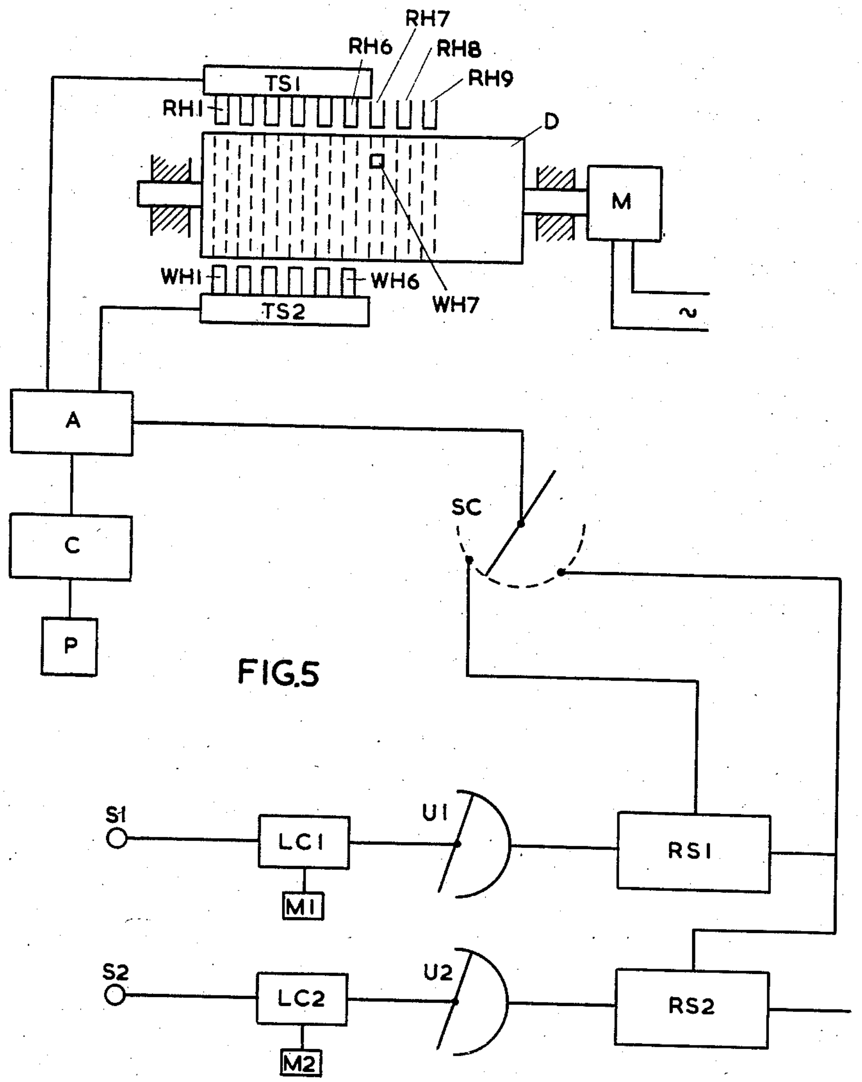

The invention will be better understood from the following description of one method of carrying it into effect which should be taken in conjunction with the accompanying drawings comprising Figs 1–5. Figs. 1–4 show by means of the usual circuit diagrams sufficient details of the carrying out of the invention to enable it to be understood. Figs. 1 and 2 which are intended to fit together with Fig. 2 below Fig. 1 show details of the circuit elements used for recording on a magnetic drum numbers dialled by a calling party. Fig. 3 shows the circuits of a multi-metering and timing control panel and Fig. 4 shows a suitable arrangement for obtaining control pulses at the required intervals. Fig. 3 also includes circuits which show how the various timing controls may be conveniently employed to effect forced release if no dialling takes place, for instance because the initiation of a call has been due to a fault on the line or if the subscriber delays unduly during the dialling operation. Fig. 5 shows diagrammatically sufficient of the general layout of the system to enable it to be understood and also indicates in general outline the physical construction of the drum and its associated equipment.

Figs. 1–4 indicate, in the same way as in the specification previously referred to, the grouping of coincidence circuits for effecting the operation and restoration of what are referred to in the earlier specification as memory circuits. These can better be termed electronic relays and will be so referred to hereinafter.

Each of these electronic relays comprises a toggle circuit of the well-known Eccles-Jordan type having two stable positions. Such a relay is changed over to its operated condition in response to an operating input pulse and is restored to its original condition by an input reset pulse. In its operated condition it applies potential to an output lead and for many purposes it is desirable to make use of a second lead giving an inverse output i. e. potential is applied thereto when the relay is in its normal or unoperated condition.

Control of the relays is effected by way of coincidence or gate circuits of known type and for this purpose various inputs may be combined. These may comprise outputs from other relays, time pulses or outputs from other circuits which may, for instance, vary in accordance with the conditions of the subscribers' lines. The outputs from the relay circuits may also be applied, generally by way of further coincidence circuits, to the so-called A and B leads which control the recording which is made in the various storage areas. In accordance with the recognised conventions, as explained in the earlier specification, potential connected to the A lead effects the writing or maintenance of a 0 and connection of potential to the B lead effects the writing or maintenance of a 1, while if potential is connected to both leads simultaneously the effect of the B lead predominates and a 1 is written.

In the system considered, it is assumed that six circumferential tracks are associated with a set of common equipment and that each track comprises 20 register positions, that is to say positions each sufficient for dealing with any one call. Each register position is divided into 14 blocks or sections and each of these blocks is divided into six unit areas. The time pulses employed are related to this scheme of division, there being 6 TX pulses designated TX1–TX6 corresponding to the individual areas, 14 TY pulses TY1–TY14 corresponding to the 14 blocks and 20 TZ pulses TZ1–TZ20 corresponding to the 20 register positions. The different tracks are associated in turn with the common equipment under the control of TW pulses of which with the assumptions made there will be six designated TW1–TW6 to form a complete cycle.

Of the various blocks corresponding to the TY pulses, TY1 is employed for detecting an interdigital pause, TY2 is used for the storage of call charging information, TY3–TY8 are used for the storage of the translated routing digits, TY6–TY8 are also used initially for the storage of the exchange code digits dialled by the calling party, TY9–TY12 are used for the storage of numerical digits, TY13 serves for the control of call timing and forced release and TY14 is used for detecting a change in the condition of the line associated with the registers. Storage of numbers is assumed to be on a binary basis.

The control circuits are divided into two groups represented by Fig. 1 on the one hand and Figs. 2 and 3 on the other. The group illustrated in Fig. 1 comprises a control for each register track, of which there are six in the present embodiment, providing a total of 120 register positions, and this control is concerned only with recognising the loop or disconnection conditions of the line for each register in use, and with storing indications of a change of condition from closed to open which is done in the appropriate storage positions TY14, TX(5+6). Of the other group, that represented by Fig. 2 comprises a common control which reads the information stored in each section TY14 of the six different tracks in turn, and registers the dialled impulse or impulses in the appropriate digit store. The equipment indicated in Fig. 3 serves to control metering or forced release and it will be understood that the same leads SAS, SBS and POF are concerned as in Fig. 2.

Fig. 1 shows diagrammatically the regular reading head RH, reading amplifier RA, and pulse shaper PS from which the normal and inverse outputs SLN and $\overline{\text{SLN}}$ are obtained. In order to give the desired regenerative action, the pulse shaper PS is connected to the regenerative switch RSO which is also controlled over the A lead SAN and a connection extends to the regenerative switch RSI which is also controlled over the B lead SBN. The output passes to the signal corrector SC and by way of the writing amplifier WA to the writing head WH. There is also provided an auxiliary reading head such as PRH for each track and this is located one register position ahead of the regular reading head RH. The heads PRH are connected to track switching equipment TS which under the control of the track waveforms TW1–TW6 connects the outputs from the different heads in turn to the amplifier PRA and pulse shaper PPS from which outputs SLP and $\overline{\text{SLP}}$ are obtained. There is no writing head associated with the reading head PRA and hence no question of regeneration arises.

Since six register tracks are assumed to be employed, it will be seen that the common control circuit will only deal with a particular register once in every six electrical revolutions of the drum, while the track circuits deal with each calling line once for each electrical revolution. The expression "electrical revolution" is intended to describe the movement of the whole of the effective track length past the reading and writing heads. This may be the same as a physical revolution of the drum but in practice it may be more convenient to locate the reading and writing heads at diametrically opposite points and to make the effective track length equal to half the circumference of the drum. The drum is arranged to make one electrical revolution in 16⅔ ms., so that the time between successive examinations of a subscriber's line is less than the normal duration of either the open or the closed period so that each such period is clearly distinguished by the line scanning equipment.

Considering now the general layout shown in Fig. 5, S1 and S2 represent typical subscribers' stations which extend respectively to line circuits LC1 and LC2 located in the associated exchange. These line circuits incorporate call fee meters M1 and M2 which for convenience are shown separately. Each line circuit is also assumed to have associated with it a uniselector or the like such as U1 and U2 by means of which access is obtained to a relay set such as RS1 and RS2 over which the desired connection is subsequently extended.

As already described, control is effected by means of a so-called magnetic drum D which is a cylinder provided with a thin surface layer of magnetic material and mounted in suitable bearings so as to be rotatable about its own axis and driven at constant speed by an electric motor M. In the form considered the drum is arranged to accommodate nine circumferential tracks, shown dotted, which are defined by corresponding reading heads RH1–9. As already mentioned it is assumed that six register tracks are provided and the corresponding reading heads RH1–6 are associated with track switching equipment TS1 so as to give an output from each reading head in turn to the amplifying and control equipment represented by A. The register tracks are also provided with corresponding writing heads WH1–6 which are connected up in turn by similar track switching equipment TS2 so that writing operations are possible successively on the different tracks. In each case track switching is done under the control of the pulses TW1–TW6.

The reading head RH7 is associated with a so-called transfer track having also a writing head WH7. These are located apart a distance equal to the length of one register in the register tracks and are arranged to operate regeneratively so that information fed into the writing head is repeated round the circumference.

The reading head RH8 is associated with a so-called address track which as in the application previously mentioned contains permanent information corresponding to the various initial digits which may be dialled to determine the routing and the basis of charging. Finally there is a reading head RH9 associated with a so-called library track which contains the routing digits and permanent code markings representing the various bases of charging corresponding to the information on the address track. Since the address and library tracks contain permanent information which is not altered during ordinary operation, writing heads are not required and therefore have not been shown.

As in the arrangement previously mentioned, the method of operation is that as soon as the initial digits identifying the wanted exchange have been recorded, the registration is transferred to the transfer track and compared with the recordings on the address track. When correspondence is found, the related information in the library track is transferred to the transfer track and subsequently to the register track so that it is able to control the setting up of the connection and the subsequent metering operation.

The control equipment A is connected to a distributing or scanning arrangement SC shown conventionally as a continuous-operating rotary switch but in practice comprising a static arrangement controlled by TZ pulses. This scanning arrangement accordingly operates in synchronism with the movement of the drum and ensures that any particular relay set, for instance RS1, is associated with the control equipment A at a time when the portion of the register track individual to that relay set is co-operating with the appropriate reading and writing heads RH1 and RW1.

The pulse source P supplies pulses to the control equipment C by which certain of the pulses are suppressed as more closely described in connection with Fig. 4. The output is then fed to the control equipment A to produce markings on the drum as explained in connection with Fig. 3.

As is normal telephone practice a register is arranged to be associated with a particular calling line by means of equipment external to the magnetic drum such as the uniselector U1, Fig. 5, and when a register has been taken into use, it examines the calling line once every 16⅔ ms. through line scanning equipment controlled by the TZ pulses. This examination is made during the time that element TX3 of TY14 is passing the appropriate writing head, which time period is defined by a coincidence circuit involving two time pulses as explained in the above-mentioned application.

The output PIA obtained from the line scanning equipment SC, Fig. 5, determines whether the line loop is closed or open and a looped line will give a suitable potential on wire PIA which may be added to the above-mentioned coincidence circuit to operate an electronic relay MAN, Fig. 1, if the scan detects a looped line in the time position TX3.TY14.

When relay MAN operates, an output signal may be taken from it, to record its operation, during the scan of element TX4, the line condition element. SBN represents the B lead appropriate to the track panel shown in Fig. 1. If relay MAN is operated by a looped line, a 1 may be written in the appropriate element TX4.TY14 by the operation of a coincidence circuit which connects potential to the B lead SBN if relay MAN is operated in the time position TX4.TY14.

If the subscriber's loop is open, either because dialling is taking place or after the subscriber has replaced his handset, relay MAN will not operate during the scan of element TX3.TY14. Adopting the convention of underlining to indicate a reversed output, in this case a second output $\overline{\text{MAN}}$ may be taken from the unoperated relay and this can be used to record a 0 in the line condition element by coinciding it with the time pulses TX4 and TY14 to produce potential on lead SAN which is the A lead appropriate to the track panel shown. It will be seen later that relay MAN is normally operated during the scan of the track section TY1–13, and hence the limitation represented by the signal TY14 is superfluous and it is satisfactory to use only the time pulse TX4.

The commencement of a dialled impulse is recognised as a change in the condition of the subscriber's line from loop closed to loop open. If during a scan it is found that relay MAN does not operate during the period TX4.TY14, it is assumed that a dialled impulse is being received, and the unoperated condition of relay MAN is used to register the impulse in one of the storage positions TX5 or TX6 of TY14.

TX5 is normally used, but if the dialled impulses are being received at a speed appreciably exceeding 10 per second, it is possible that a second impulse may be received before the first impulse has been dealt with by the common equipment, and in this event the second impulse is stored in the TX6 element. It is therefore necessary to detect whether TX5 is unmarked or is already in use, and a signal from the reading head is used in a coincidence circuit to ensure that the impulse is stored in the first unmarked element of the two. The reading head used in conjunction with an individual track equipment gives rise to two output signals: SLN when it encounters a 1 on the track, and $\overline{\text{SLN}}$ when it encounters a 0. The coincidence circuit used for writing a 1 by the connection of potential to lead SBN involves the coincidence of relay MAN unoperated, no output from the reading head, and the time pulse TX(5+6).

If, during the scan of either TX5 or TX6 of TY14, therefore, a 0 is read, with relay MAN unoperated, potential is connected to lead SBN in order to write a 1 in that position. If the digit is to be stored in element TX5, it is necessary to ensure that a 1 is not written in element TX6 as well, and this is done by using an $\overline{\text{SLN}}$ signal at element TX5 to operate relay MAN by the coincidence of no output from the reading head, i. e. $\overline{\text{SLN}}$, and the time pulse TX(4+5+6).

It will be seen that element TX4 has been included as an additional period during which a 0 encountered by the reading head will cause relay MAN to operate. The reason for this is that if two successive scans of the calling line find the loop open, relay MAN would remain unoperated on both occasions and on the second scan the 0 written in element TX4 of TY14 during the previous scan would be encountered. It must be ensured that the same impulse is not registered twice, and therefore the coincidence $\overline{\text{SLN}}$.TX4 is included to operate relay MAN so that this is prevented.

It was stated earlier that relay MAN is normally operated over the track section TY1–13, and it will now be apparent that the coincidence circuit just mentioned will produce this effect since there will always be a 0 in at least one of the positions TX4–TX6 of block TY14 to bring about the reoperation of relay MAN which then remains operated. The only exception is if impulsing takes place at a speed in excess of 20 I. P. S. which will produce false operation in any event since the equipment is not designed to cater for it. Relay MAN is released at the beginning of the section TY14 in each register by the coincidence of the time pulses TX1 and TY14.

The common control equipment indicated in Fig. 2 deals with all the 120 registers in six tracks, the individual circuits shown in Fig. 1 being switched sequentially. With a drum speed such that it takes 16⅔ ms. to traverse one track, it will take 100 ms. to traverse sequentially six tracks and so each register is scanned once each 100 ms. The common equipment examines the storage elements TX5 and TX6 of TY14 in each register in turn, and transfers any digits stored there to the appropriate digit store TY6–TY12 in that register. The common equipment is also employed to detect the end of an impulse train being dialled into a register.

Examination of elements TX5 and TX6 of section TY14 of a register is made by an auxiliary reading head such as PRH, Fig. 1, which as already mentioned is located a distance of one register in advance of the normal reading head, to enable advance information to be read from any section. The signals derived from the auxiliary reading heads such as PRH when they encounter a 1 appear in turn on lead SLP under the control of the track time pulses TW1–6 applied to the track switching equipment TS and similarly for the reverse output appearing on lead $\overline{\text{SLP}}$ and representing a 0 encountered by the reading head. When a 1 is read by the auxiliary reading head in either of the impulse storage elements, an electronic relay MAB is operated by the coincidence of SLP and the time pulses TX(5+6) and TY14.

If relay MAB is operated by an impulse stored in element TX5, it is possible that a second impulse is stored in element TX6, and a second relay MBB is therefore arranged to be operated if both TX5 and TX6 are occupied. An output signal from the operated relay MAB is conveniently used in a coincidence circuit to indicate that element TX5 was marked, the operation of relay MBB resulting from the coincidence of the operated condition of relay MAB, the output SLP, and the time pulses TX(5+6) and TY14.

The inclusion of TX5 in this circuit is not necessary, but it is not objectionable and the use of the existing combined time pulse lead TX(5+6) reduces the number of such leads which have to be provided.

Once the impulse storage elements have been examined, any marking there must be removed to enable further dialled impulses to be registered. This is done by connecting potential to lead SAS, to erase the marking in these elements immediately they are read by means of a coincidence circuit involving only the time pulses TX(5+6) and TY14.

It will be seen that the connections to lead SAS involve a cathode follower V1 in order to ensure the necessary power output. Lead SBS similarly involves valve V2.

When one or more dialled impulses have been read in the impulse storage elements, and relay MAB is operated, the common control equipment must next determine to which digit the latest received impulse or impulses belong, i. e. to which digit store they must be added. During free or idle conditions, a register digit store has its busy element TX2 marked with a 0, and this is only changed to 1 when a complete digit has been registered therein as evidenced by the detection of the following interdigital pause. It is therefore only necessary for the normal reading head to find the first digit store with a 0 written in the TX2 element, and this will be the store awaiting the next impulse.

The normal reading heads are switched sequentially under the control of the track timing pulses TWN and have an output signal SLS when reading 1, and an output $\overline{\text{SLS}}$ when reading 0. When the required digit store has been located, relay MCB is operated by the coincidence of relay MAB operated, no output from the reading head, and the time pulses TX2 and TY(6–12), this latter corresponding to all the blocks in which dialled digits can be recorded.

Relay MAB can now be used to add the impulse or impulses to the digit already stored in the elements TX3–TX6 of that store.

When 1 is to be added to a number in binary form, the well-known rule is to reverse the symbols in turn, starting from the lowest order, until a 0 has been changed to a 1. When 2 is to be added, no change is made to the lowest order symbol, but the same rule is applied to the remaining symbols. In the present case, the lowest order is stored in element TX3, and is the first of the four elements to pass under the reading head.

The outputs from operated relays MAB and MCB, and from non-operated relay MBB are coincided to add 1 to a stored digit, this coincidence causing potential to be applied to lead SAS, and the coincidence also of no output from the reading head causing potential to be connected to lead SBS.

The first of these circuits attempts to write 0 in each of the four elements, while the second writes 1 in every element in which a 0 is read. There is thus a reversal of marking in each element. This is stopped after the reading head has encountered the first 0, i. e. after the first signal $\overline{SLS}$ has been received, by using this signal to release relays MAB and MCB when there is coincidence of relay MAB operated, relay MBB not operated, relay MCB operated, no output from the reading head, and time pulse TX(3—6). The reversals thus stop after a 0 has been changed to a 1.

Where 2 is to be added, relay MBB also is operated. The two reversal circuits set out above are therefore ineffective until relay MBB is made to release during period TX3, after which reversal occurs as before until a 0 is changed to a 1. The lowest order is therefore unchanged while the remaining orders are manipulated, which is the condition for adding 2 as stated above. Relay MBB is released by the coincidence of relays MAB, MBB and MCB all operated. Relay MAB is included to confine the operation to scans when impulses are to be transferred; relay MCB operates only in TX2, and therefore limits the operation to element TX3, and relay MBB is included to avoid similarity to a later circuit.

After a 0 has been changed to a 1 and relays MAB and MCB are being released, there is no objection to reoperating relay MBB since no further reversals can then take place, and the operated relay MBB may then be used during period TY13 to cancel the forced release timing information in that section. Relay MBB on this occasion is operated by the same coincidence as produced the release of relays MAB and MCB, namely, MAB operated, MBB released, MBC operated, no output from the reading head, and time pulse TX(3—6). The coincidence of relay MAB released, relay MBB operated, and time pulse TY13 has the effect of connecting potential to lead SAS and thus erasing any markings in block 13.

The output from the unoperated relay MAB is used in this circuit in order to prevent a subscriber cancelling the meter timing and thus extending a timed call by impulsing the line during conversation, MAB under these circumstances remaining operated until it is restored by the coincidence of time pulses TX2 and TY14. It will be appreciated that the timing of metering periods is also effected in block 13, as subsequently described.

Succeeding scans at 100 ms. intervals will continue to read the impulse storage elements TX5 and TX6 of TY14 with the auxiliary reading head, and add to the digit in the appropriate digit store with the normal register track writing head, until the end of an impulse train is reached and a digit is completed. It will be recalled that relay MAB is first operated when the auxiliary reading head detects a stored impulse in block TY14, and, as just explained, is released when the scan reaches the relevant 0 element of the digit store which is in process of being filled. If, then, relay MAB is unoperated during the passage of block TY1 under the writing head, this is an indication that no dialled impulse has been received since the last scan by the common equipment.

Element TX5 of section TY1 is used to register this condition, and if no impulses have been received for 100 ms. a 1 is written in this element by the coincidence of relay MAB not operated, and the time pulses TX5 and TY1 causing potential to be connected to lead SBS. If after a further 100 ms. no impulse has still been received, relay MCB is operated by the coincidence of the output obtained from the 1 written in TX5.TY1 on the previous scan, with the non-operation of relay MAB. The operation of relay MCB causes a 1 to be written in element TX6 of section TY1 to mark the end of an impulse train. This is done by the coincidence of relay MCB operated with the time pulse TY1 connecting potential to lead SBS, the inclusion of the timing element TX6 being unnecessary, because it is the only element remaining in the scan of TY1 after relay MCB operates. Relay MCB can now be used to write a busy marking in the last completed digit store potential being connected to lead SBS by the coincidence of relay MBB not operated, relay MCB operated, and time pulses TX2 and TY(6—12). The effect is that a 1 tends to be written in turn in any busy marking element which is not already so marked. It is necessary accordingly to release relay MCB after the busy marking has been written in the last completed store, i. e. it must be released by the first store encountered in which the TX2 element has a 0 written in it. This means a reset circuit for relay MCB involving the coincidence of relays MAB and MBB not operated, no output from the reading head, and time pulses TX2 and TY(6—12). The signal due to the unoperated relay MAB is included to distinguish the coincidence from that used in the normal scan when an impulse is to be transferred.

To avoid the repetition of this marking in later stores by the re-operation of relay MCB in the TX5.TY1 position during subsequent scans, the presence of the mark in element TX6.TY1 is used to release the relay on the next scan, the required coincidence circuit involving relay MBB not operated, output from the reading head, and the time pulses TX(5+6) and TY1.

It will be seen later that relay MBB is operated when a long line break occurs, indicating that the subscriber has replaced his handset, and the signal from the unoperated relay MBB is used in the last three coincidence circuits to differentiate between the two functions of relay MCB.

Assuming however that normal dialling is taking place, as soon as a further impulse is received, it will be necessary to terminate the interdigital pause sequence by cancelling all markings in section TY1. To effect this cancellation, potential is always applied to lead SAS during TY1 but potential is applied also to lead SBS in two circuits, one involving the coincidence of relay MAB not operated and the time pulses TX5 and TY1, and the other involving the coincidence of relay MCB operated and time pulse TY1, and accordingly the markings are allowed to remain in block TY1 for as long as relay MAB remains unoperated, relay MCB being operated by the coincidence of relay MAB not operated, output from the reading head, and time pulses TX5 and TY1.

When the loop is next opened, the line break is detected by the auxiliary reading head by examination of the element TX4.TY14, in which, it will be recalled, a 0 is written when the line scan finds the subscriber's line loop open. The detecting circuit, which operates relay MBB under this condition, is the coincidence of no output from the auxiliary reading head, and time pulses TX4 and TY14. If this occurs for a normal dialled impulse, the operation of relay MBB is ignored, and the relay is reset if a 1 is written in elements TX5 or TX6 of TY14, by the coincidence of relay MAB not operated, output from the auxiliary reading head, and time pulses TX(5+6) and TY14. The output from the unoperated relay MAB is required in this coincidence to distinguish it from the normal operating coincidence circuit for detectng a second impulse condition.

If however relay MBB is not immediately reset, a line break of more than 100 ms. is indicated, and if the line loop is still open after a further 100 ms., this corresponds to the condition that the calling party has hung up. Relay MCB is now operated during the scan of element TX5.TY1 as previously described. The coincidence of signals from the operated relays MBB and MCB and from the unoperated relay MAB is employed to apply a general cancel condition to sections of the register scanned later than TX5.TY1 by connecting potential to lead SAS. When section TY13 is being scanned, a further coincidence circuit provides a signal by way of cathode follower V3 to wire POF which passes to the relevant relay set to operate a relay which initiates disconnection of the register from the previously calling line. This is represented by the coincidence of relays MBB and MCB operated, and time pulse TY13 applying potential to lead POF.

All three relays must be released in time for the scan of the next register on the track, and this is effected by the coincidence of time pulses TX2 and TY14 in each case. The register considered is now clear and ready for use by another calling line.

If the full complement of digits is received, the register is retained at least until the translated routing code and numerical digits have been transmitted, and also the necessary metering pulses after the called party replies and may then be released by the relay set. If however repeat metering at timed intervals is being employed it will be retained throughout the connection. The writing in of the appropriate translation and the subsequent transmission of the required trains of impulses may be effected for instance as described in application Serial Nos. 300,432, filed July 23, 1952, of G. T. Baker, and 300,430, filed July 23, 1952, of G. T. Baker et al.

Considering now the metering arrangements in more detail, attention will first be given to the timing circuit shown in Fig. 4 the upper part of which indicates a ring of 30 toggle circuits of the Eccles-Jordan type connected in known manner so that in response to pulses fed in over lead PL to the grids or cathodes, the different toggles will be reversed in turn, the toggle previously operated being restored when the succeeding toggle is operated. Lead PL supplies pulses at intervals of 100 ms. which can conveniently be obtained from a combination of the other timing pulses which may be described as

TX6.TY14.TZ20.TW6

This interval of 100 ms. it will be appreciated is the interval at which any particular one of the six tracks is scanned. Since there are 30 toggle circuits in the ring and they are operated at intervals of 100 ms. the timing for a complete cycle is 3 seconds. This represents the degree of error in the accuracy of the commencement of timing; that is to say, after the called party replies so that metering is required to take place, there may be an interval of anything up to 3 seconds before such metering is in fact initiated.

In order to obtain pulses at suitable intervals for effecting the desired timing operations, toggle circuit 1 provides a start pulse and toggle circuit 7 then controls the sending of the first metering pulse after an interval of 600 ms. and subsequent metering pulses if required are then sent from toggle circuits 11, 15, 19, 23, 27 and 1 after succeeding intervals of 400 ms. This is in accordance with the present practice of the British Post Office but it will be appreciated that other intervals could readily be arranged to meet the wishes of any particular telephone administration.

The system shown is designed for a multi-metering system with a maximum of seven pulses but this also is purely arbitrary and there would be no particular difficulty of arranging for larger or smaller numbers to meet specific requirements. It is thought however that six pulses is probably the largest number which can conveniently be employed in practice and it would generally be desirable for calls of higher value to be dealt with on a timed basis. The equipment shown is capable of providing multi-metering either on an untimed basis, that is to say in accordance with the destination of the call one or more metering pulses are transmitted when the called party replies, or on a timed basis, a single metering operation taking place when the called party replies and after the lapse of successive predetermined periods which may however be varied in accordance with the value of the call. It could readily be arranged if desired that these two methods of operation were combined, that is to say a plurality of metering pulses are transmitted for each predetermined period during which the call is in progress or also that the period is varied.

As a matter of convenience, certain of the metering timing pulses are combined in the arrangement of Fig. 4. Thus the pulses from the toggle circuits 11 and 15 are combined in known manner by the use of a rectifier network and similarly the pulses from toggle circuits 19, 23, 27 and 1 are combined. The various pulses are also coincided with certain of the TX timing pulses and combined by way of valve V8 to give an output TMM.

For facilitating further control, certain other pulses are combined and coincided by way of valve V9 to give an output TMT. The pulses concerned are indicated on the right-hand side of Fig. 4 and it will be appreciated that combination would take place by way of buffer rectifiers as for the other combination lead.

It has already been explained that the metering information appropriate to the dialled number is recorded in the second block for each register corresponding to time pulse TY2 and with the assumption made of a total of six multi-metering fees, or alternatively the possibility of timing, storage is effected in positions 3, 4, 5 and 6 corresponding to time pulses TX3, 4, 5 and 6.

The setting up of the necessary record in the second block is assumed to be effected from the appropriate library track at the same time as the routing code is transferred to blocks 3–8, for instance in the manner disclosed in application Serial No. 300,432 previously referred to. This routing code is then transmitted in the general manner disclosed in application Serial No. 300,430, filed July 23, 1952, of G. T. Baker et al. and the last function of the pulsing-out equipment is to insert 1's into the whole of block 13 which is used for counting purposes. This provides the state which may be reached after subsequent timing operations so that for both initial and repeat metering, when block 13 has been completely marked, it indicates that a metering operation is called for.

Referring now more particularly to Fig. 3, if there is a marking in the first position in block 13, the auxiliary reading head, which is located one complete register section ahead of the main reading head, effects the operation of relay MCE by the coincidence of the output from the auxiliary reading head and time pulses TX1 and TY13. Unless block 13 is already fully marked, the auxiliary reading head will encounter a 0 in at least one of the subsequent TX positions and this will have the effect of resetting MCE by the coincidence of no output from the auxiliary reading head and time pulse TY13. If however there is already a full marking indicating that metering is due to take place, relay MCE remains operated and when block 12 co-operates with the main reading head, relay MAE is operated by the coincidence of relay MCE operated and time pulse TY12.

Relay MCE is reset by the following register unless this also has TY13 fully marked. Relay MAE if not required by the following register is also reset by the coincidence of no output from the auxiliary reading head, and time pulses TX1 and TY14, i. e. no marking in TX1.TY14.

It is clear however that metering must not take place unless and until the called party replies and consequently relay MAE may be operated on a number of occasions in association with a particular connection without any further effect being produced. When however the called party in this particular connection replies, potential will be applied at the appropriate time under the control of the D relay in the relay set to lead PID with the result that a marking is effected in the so-called metering start control position 1 of block 14 due to the connection of potential to lead SBS by the coincidence of potential on PID, MAE operated, no output from the reading head, and time pulses TX1, TY14 and TMM. The inclusion of the factor "no output from the reading head" in this coincidence circuit is necessary to prevent this marking being maintained on the following cycle when it is desired that a cancelling circuit should become effective. TMM ensures that the marking cannot be effected until the beginning of the metering cycle indicated by the pulse on TMM produced by the coincidence TX1.TM1, Fig. 4. These conditions are now maintained until the appropriate meter pulse becomes available and on each cycle during this time, relay MAE is operated by the coincidence of output from the auxiliary reading head, and time pulses TX1 and TY14 but produces no effect and is reset by the following register if metering is not required in connection therewith.

Consider first the case in which a call is not being timed but merely that the appropriate number of meter pulses are sent on the one occasion only, and assume also that a meter fee of 3 is appropriate so that there will be markings in positions TX4 and TX5 of TY2. When the pulse represented by the coincidences TX3.TM7 and TX4.TM7 appears on lead TMM, that is 600 ms. later, relay MBE is operated by the coincidence of relay MAE operated, output from the reading head, and time pulses TX(3—6), TY2 and TMM. It will be noted that in addition to the TX4, 5 and 6 time pulse positions corresponding to a fee of up to six units, the position TX3 is also included and this is used for the control of a single meter fee on timed calls as will be described shortly. The operation of MBE is effective during position TY13 to cause potential to be connected to the impulse wire POI by way of valve in consequence of the coincidence of relay MBE operated and time pulse TY13. Relay MBE also cancels the markings in TX(3—6) of TY13 thereby suppressing further operation of MAE in its function of detecting all 1's in TY13. This is done by the coincidence of relay MBE operated and time pulses TX(3—6) and TY13, which results in the connection of potential to lead SAE.

The use of TX(3—6) is concerned with the operation on a timed call as will be described later. Relay MBE is reset by the time pulse TY14.

Since a total of three meter fees is to be sent, relay MBE will again be operated due to the TX5.TM11 output on lead TMM and 400 ms. later due to the TX5.TM15 output, but since there is no marking in TX6, relay MBE is not operated by the pulses on lead TMM corresponding to TM19, TM23, TM27 and TM1 which are coincided with TX6. When the start position is again reached, the meter start control making is erased by the connection of potential to lead SAS in consequence of the coincidence of the time pulses TX1, TY14 and TMM. During subsequent metering cycles relay MCE is reset during TY13 and consequently relays MAE and MBE cannot again be operated.

Consideration will now be given to the case in which repeat metering is employed and the difference for calls of various values is effected by varying the intervals at which a single repeat metering operation occurs. In the arrangement as illustrated, there will be a marking in TX3.TY2 if repeat metering is required, and the markings in TX4 and 5 in this block determine the repetition interval, the intervals assumed being 15 seconds, 30 seconds, 1 minute and 3 minutes. As already mentioned, the signal for timed metering to take place is that the timing block TY13 is fully marked which may be due either to the completion of the setting up of the call or to a subsequent period having expired. Any other condition for a timed call requires that a count shall be made in block 13. When such a condition exists relay MDE is operated by the coincidence of relay MCE not operated, output from the reading head, and time pulses TX3, TY2 and TMT. This circuit becomes operative since as mentioned above there is a marking in TX3.TY2 if repeat metering is to take place and the output on TMT can be coincided with TX3 in any of the timing positions TM19–TM30. The inclusion of the factor representing non-operation of relay MCE serves to halt the counting operation while metering pulses are actually being sent.

In every case the count used to fill the block TY13 is 60 and since the different TM pulses from the counting ring are available at 100 ms. intervals, this means that for a 15-second timing period 12 must be added to the count every 3 seconds, for a 30-second timing period 6 must be added every 3 seconds, for a 1-minute timing period 3 every 3 seconds and for a 3-minute timing period 1 every 3 seconds. MDE may accordingly be operated 12 times during the period if all of the timing pulses TM19–TM30 are made use of and this will be correct for the shortest timing period of 15 seconds. If however a longer timing interval is required, there will be markings on TX4 or TX5 of TY2 or both and the effect of these markings is to reset MDE before it has become operative so that all 12 timing pulses do not become effective. Thus assuming that there is a marking on TX4.TY2, corresponding to a 30-second timing interval, relay MDE is reset by the coincidence of output from the reading head, and time pulses TX4, TY2 and TMT on each of timing pulses TM19–24 in the TMT output and consequently is not operative during TY13 when counting takes place as will shortly be described. If TX5 is marked but not TX4 in TY2, relay MDE is reset by timing pulses TM21–29 and hence only pulses TM19, 20 and 30 are effective so as to give a 1-minute timing period. If both TX4 and TX5 are marked, only time pulse TM30 is effective since for all the remainder of TM19–30, relay MDE has already been reset.

The effect of the operation of MDE if it persists sufficiently long is to add 1 to the count in the block TY13 in known manner by reversing all the existing registrations until a 0 has been changed to a 1 whereupon relay MDE is reset and no further operation takes place. To produce this effect, potential is connected to lead SAS by the coincidence of relay MDE operated and time pulse TY13, while a similar coincidence circuit including in addition, no output from the reading head, connects potential to lead SBS.

When a full count is reached in TY13, relay MCE remains operated and prevents further operation of relay MDE until the necessary metering pulse has been transmitted. During TY12 relay MCE operates MAE which then inserts the meter start control marking in TX1.TY14 as previously described assuming the call is still in progress. Relay MAE is therefore again operated on the next scan and brings about the operation of relay MBE during the period TM7 of the meter cycle by the coincidence TX3.TM7 on lead TMM. Relay MAE is now reset by the coincidence of output from the reading head and time pulses TX3 and TY2 and hence on subsequent scans it is impossible for relay MBE to be operated by the meter pulses on lead TMM which are coincided with TX4, TX5 and TX6. Thus the markings in TX4 and TX5 only control the duration of the remetering period and not the number of meter pulses transmitted on each occasion. Relay MBE controls the transmission of a meter pulse during TY13 as previously described by connecting potential to lead POI due to the coincidence of relay MBE operated and time pulse TY13 and also cancels the markings in TX(3—6) of TY13 thereby reducing the binary registration from 63 to 3. This is done by the connection of potential to lead SAS over the coincidence circuit formed by relay MBE operated, and time pulses TX(3—6) and TY13. Accordingly the complete count is always 60 as previously explained.

The meter start control marking is erased as before at the beginning of the next metering cycle and timing in TY13 is resumed as soon as relay MCE is reset due to the cancellation of the markings in TY13.

It will be appreciated that the system described provides either for multi-fee metering or single meter pulses at defined time intervals. If a combination of the two methods is required, that is multi-fee at defined time intervals, all that is required is the separation of the storage areas used. For instance if TX4, 5 and 6 of TY2 be retained for storing the multi-fee information, then TX1, 2 and 3 could be used for storing the timing information. In such a system the above described reset circuit for relay MAE would be unnecessary, as reference would have to be made to the stored fee in all cases.

Consideration will now be given to the arrangement for using a counting operation in TY13 to give forced release if the subscriber does not proceed sufficiently rapidly with his dialling operation.

The operation is generally similar to the repeat metering arrangement on the basis of a 15-second interval, that is to say the forced release operation comes into effect if the subscriber delays for more than 15 seconds before dialling or between successive digits. The timer is cleared each time the line is interrupted and if it builds up to a full count representing 15 seconds, the forced release condition is brought into operation.

As is clear from the description of Fig. 1, if the line in question is in the closed condition, there is a marking in TX4.TY14 and this when picked up by the auxiliary reading head operates relay MEE by the coincidence of output from the auxiliary reading head, and time pulses TX4 and TY14.

When the subscriber is dialling or opens the line because he is abandoning the call, there will be a marking in TX5 and possibly TX6 of block 14 as explained in connection with Fig. 2. In these circumstances relay MEE is reset by the coincidence of output from the auxiliary reading head, and time pulses TX(5+6) and TY14.

The cancellation of the marking in TY13 is effected by the coincidence of relay MAB not operated, relay MBB operated, and time pulse TY13 as shown in Fig. 2 and already described whereby TY13 is cleared each time an impulse is added to the digit then being set up. Furthermore it is obviously required that the throw-out circuit should not come into effect if the subscriber has completed dialling, after which there is likely to be an interval exceeding 15 seconds before the called party replies. This requirement can readily be taken care of because on the completion of dialling there will be a busy marking in TX2 of block 12 corresponding to the last digit. Accordingly a coincidence circuit involving output from the reading head and time pulses TX2 and TY12 ensures the resetting of relay MEE when dialling is completed. If relay MEE remains operated until TX3.TY12 in the appropriate scan as determined by TMT however, it operates relay MDE by the coincidence of relay MCE not operated, relay MEE operated, and time pulses TX3, TY12 and TMT and relay MDE accordingly operates as previously described to add 1 to the count in TY13.

The inclusion of MCE in this circuit means that when the counting block becomes full, the counting operation is stopped. As long as the counter is not full, the fact that relay MCE is not operated can be employed to restore relay MEE, for instance in position TX5 of TY12 by the coincidence of relay MCE not operated, and time pulses TX5 and TY12.

When however, the counter becomes full, relay MCE remains operated and the above resetting circuit is not effective. Consequently during TY13 a signal is sent over lead POF by way of valve V7 due to the coincidence of relay MEE operated and time pulse TY13 and the distributing equipment to the appropriate relay set to initiate the forced release condition as described for the case when the calling party hung up prematurely. Relay MEE is then reset during the scanning of block 14 by the coincidence of time pulses TX1 and TY14.

The expresison "magnetic drum" used herein implies a cylindrical structure and such a structure will generally be the most convenient arrangement in practice but the expression is also intended to cover the use of a disc or tape.

We claim:

1. In a telephone system, a drum with a surface of magnetic material, means for rotating said drum about its axis at a constant speed, a writing head associated with a circumferential track on said surface, a plurality of lines, call fee meters respectively associated with each of said lines, means including said writing head for recording dialled information transmitted over any of said lines in portions of said track individually associated with said lines, means for supplying pulse trains of different values, means controlled by said registered dialled information for selecting the appropriate pulse train in respect of individual lines, means for registering in each of said portions the number of pulses received for the corresponding individual lines, and means operative on the number of pulses registered in any portion attaining a predetermined value for erasing said registration and effecting the operation of the call fee meter associated with the corresponding line.

2. In a telephone system, a drum with a surface of magnetic material, means for rotating said drum about its axis at a constant speed, a writing head associated with a circumferential track on said surface, a plurality of lines, call fee meters respectively associated with each of said lines, means including said writing head for recording dialled information transmitted over any of said lines in portions of said track individually associated with said lines, a source of pulses, means controlled by said registered dialled information for selectively suppressing certain of the pulses from said source in respect of any one individual line, means for registering in each of said portions the number of effective pulses received from said source for the corresponding individual lines and means operative on the number of pulses registered in any portion attaining a predetermined value for erasing said registration and effecting the operation of the call fee meter associated with the corresponding line.

3. In a telephone system, a drum with a surface of magnetic material, means for rotating said drum about its axis at a constant speed, a writing head associated with a circumferential track on said surface, a plurality of lines, call fee meters respectively associated with each of said lines, means including said writing head for recording dialled information transmitted over any of said lines in portions of said track individually associated with said lines, means for supplying pulse trains of different values, means for recording on the appropriate portions of said track a code marking corresponding to the charging basis determined by the initial portion of said dialled information, means controlled by said code marking for selecting the appropriate pulse train in respect of individual lines, means for registering in each of said portions the number of pulses received for the corresponding individual lines and means operative on the number of pulses registered in any portion attaining a predetermined value for erasing said registration and effecting the operation of the call fee meter associated with the corresponding line.

4. In a telephone system, a drum with a surface of magnetic material, means for rotating said drum about its axis at a constant speed, a writing head associated with a circumferential track on said surface, a calling line, a call fee meter associated with said line, means including said writing head for recording dialled information transmitted over said line representing a portion of a wanted number, means for recording on said drum a code marking corresponding to the charging basis represented by said dialled information, a source of pulses, means for selectively suppressing certain of the pulses from said source dependent on the nature of said code marking, means for adding one unit to a numerical registration on said drum in response to each effective pulse received and means for operating said call fee meter and erasing said numerical registration each time the total recorded attains a predetermined value.

5. In a telephone system, a drum with a surface of magnetic material, means for rotating said drum about its axis at a constant speed, a writing head associated with a circumferential track on said surface, a plurality of lines, call fee meters respectively associated with each of said lines, means including said writing head for recording in portions of track individually associated with said lines dialled information transmitted over any one of said lines representing a portion of a wanted number, means for recording in said portions of track a code marking corresponding to the charging basis represented by said dialled information, a source of pulses, means for selectively suppressing certain of the pulses from said source dependent on the nature of said respective code markings, means for adding one unit to a numerical registration in said portions of track respectively in response to each effective pulse received from said source and means operative on the number of pulses registered in any portion attaining a predetermined value for effecting the operation of the call fee meter associated with the corresponding line and erasing the numerical registration.

6. In a telephone system, a drum with a surface of magnetic material, means for rotating said drum about its axis at a constant speed, a first circumferential track on said drum, a calling line, a call fee meter associated with said line, means for recording in said first track such initial digits of a wanted number dialled over said line as will determine the basis of charging, a second circumferential track on said drum having recorded thereon all possible values of said initial digits, means for comparing said digits in said first track with said digits in said second track, a third circumferential track on said drum provided with permanently recorded information related to the information in said second track, means for transferring to said first track the information in said third track in the position corresponding to the position in said second track in which identity is found with the digits in said first track and means controlled by said transferred information for controlling the operation of the call fee meter associated with said telephone line.

7. In a telephone system a drum with a surface of magnetic material, means for rotating said drum about its axis at a constant speed, a first circumferential track on said drum, a calling line, a call fee meter associated with said line, means for recording in said first track such initial digits of a wanted number dialled over said line as will determine the basis of charging, a second circumferential track on said drum having recorded thereon all possible values of said initial digits, means for comparing said digits in said first track with said digits in said second track, a third circumferential track on said drum provided with permanently recorded information related to the information in said second track, means for transferring to said first track the information in said third track in the position corresponding to the position in said second track in which identity is found with the digits in said first track and means for effecting the operation of the call fee meter associated with said telephone line a variable number of times dependent on the nature of said transferred information.

8. In a telephone system, a drum with a surface of magnetic material, means for rotating said drum about its axis at a constant speed, a first circumferential track on said drum, a calling line, a call fee meter associated with said line, means for recording in said first track such initial digits of a wanted number dialled over said line as will determine the basis of charging, a second circumferential track on said drum having recorded thereon all possible values of said initial digits, means for comparing said digits in said first track with said digits in said second track, a third circumferential track on said drum provided with permanently recorded information related to the information in said second track, means for transferring to said first track the information in said third track in the position corresponding to the position in said second track in which identity is found with the digits in said first track, a source of pulses, means for selectively suppressing certain of the pulses from said source dependent on the nature of said transferred information and means for effecting the operation of the call fee meter associated with said telephone line under the control of the effective pulses from said source.

9. In a telephone system, a drum with a surface of magnetic material, means for rotating said drum about its axis at a constant speed, a first circumferential track on said surface, a calling line, a call fee meter associated with said line, means for recording in said first track dialled information transmitted over said line to determine the basis of charging, a second circumferential track on said drum having recorded thereon all possible values of such dialled information, means for comparing the information recorded in said first track with the information recorded in said second track, a third circumferential track on said drum having recorded thereon code markings representing different charging bases and related to the information in said second track, means for transferring to said first track the code marking in said third track in the position corresponding to the position in said second track in which identity is found with the information recorded in said first track, a source of pulses, means for selectively suppressing certain of the pulses from said source dependent on the nature of said code marking in said first track, means for adding one unit to a numerical registration on said first track in response to each effective pulse received from the said source and means for operating said call fee meter and erasing said numerical registration each time the total recorded attains a predetermined value.

10. A system as claimed in claim 1 in which the determination of the period between the successive operations of the meter is always effected by the transmission at regular intervals of the same number of pulses from the source, certain of the pulses being suppressed to produce the necessary variation.

11. A system as claimed in claim 10 in which the pulse source comprises a continuously-operating ring counter one member of which provides a start pulse while selected other members provide pulses at suitable intervals for adding one unit successively to a registration on the drum.

12. A system as claimed in claim 11 in which selected members of the pulse source also provide pulses for effecting multi-fee operation of subscribers' meters.

13. A telephone system as claimed in claim 11 in which the pulse source is also employed to transmit pulses to the drum during the setting up of the call to effect a timing operation and bring about forced release if there is undue delay in the transmission of dialled digits by the calling party.

References Cited in the file of this patent

UNITED STATES PATENTS

| | | |
|---|---|---|
| 2,513,112 | Shepherd | June 27, 1950 |
| 2,587,532 | Schmidt | Feb. 26, 1952 |
| 2,594,495 | Retallack | Apr. 29, 1952 |
| 2,614,169 | Cohen et al. | Oct. 14, 1952 |
| 2,679,551 | Newby | May 25, 1954 |
| 2,700,148 | McGuigan | Jan. 18, 1955 |